US007951256B2

(12) United States Patent
Komatsu et al.

(10) Patent No.: US 7,951,256 B2
(45) Date of Patent: May 31, 2011

(54) METHOD OF MAKING A VACUUM VESSEL

(75) Inventors: Kou Komatsu, Chiryu (JP); Tokutaka Miura, Yokohama (JP); Mitsutoshi Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 12/560,230

(22) Filed: Sep. 15, 2009

(65) Prior Publication Data

US 2010/0084073 A1 Apr. 8, 2010

(30) Foreign Application Priority Data

Sep. 17, 2008 (JP) ................................ 2008-237931

(51) Int. Cl.
*B32B 37/06* (2006.01)
*B32B 37/12* (2006.01)

(52) U.S. Cl. .......................... 156/285; 156/292; 445/25

(58) Field of Classification Search ........................ None
See application file for complete search history.

(56) References Cited

U.S. PATENT DOCUMENTS

2006/0042316 A1 3/2006 Hasegawa

FOREIGN PATENT DOCUMENTS

JP 2006-93117 A 4/2006

*Primary Examiner* — Sam C Yao
(74) *Attorney, Agent, or Firm* — Canon U.S.A., Inc., IP Division

(57) ABSTRACT

In a method of making a vacuum vessel having a pair of plates including a face plate and a rear plate bonded to each other using a bonding member, a bonding member is applied to a periphery of at least one of a pair of plates, the plates are placed in contact with each other through the bonding member disposed therebetween, parts of sides of the plates are fastened to each other using a positioning jig made of bimetal, the plates are separated from each other by placing the plates in an atmosphere and by thermally deforming the positioning jig, and the plates are fixed to each other around the entire peripheries thereof using the bonding member by performing cooling so as to reduce thermal deformation of the positioning jig and making the plates contact each other through the bonding member disposed therebetween.

4 Claims, 9 Drawing Sheets

METHOD OF MAKING A VACUUM VESSEL

BACKGROUND OF THE INVENTION

1. Field of the Invention

The present invention relates to a method of making a vacuum vessel. In particular, the present invention relates to a method of making a flat image forming apparatus.

2. Description of the Related Art

Examples of existing flat image forming apparatuses include field emission displays (FEDs) and surface-conduction electron-emitter displays (SEDs). A vacuum vessel used for an image forming apparatus is generally made by disposing a face plate and a rear plate with a predetermined distance therebetween, then melting a sealing member disposed between the plates so as to bond and seal the vacuum vessel. In order to provide a secure seal, the plates are pressed against each other with a force perpendicular to the plates.

Japanese Patent Laid-Open No. 2006-93117 (corresponding U.S. Patent Application Publication No. 2006/0042316 A1) describes a method of securing conductance during a baking step and adjusting the positions of plates in in-plane directions thereof. To be specific, the relative positions of the face plate and the rear plate are fixed, the plates are fastened to each other using a positioning jig capable of adjusting the distance between the plates, and the distance between the plates is controlled using an arm that raises one of the plates.

However, it is difficult to control a pressure applied to a plate to be strictly perpendicular to the plate. Thus, when a pressure is applied to a surface of the plate, a force is generated in an in-plane direction of the plate, which is a direction parallel to the principal surface of the plate. This force may cause the relative positions of the face plate and the rear plate to deviate. Moreover, because the baking process is performed in a reduced-pressure atmosphere, it may be necessary to bond and seal the plates in the same reduced-pressure atmosphere after the baking process has finished. Therefore, it is difficult to use a large apparatus to bond and seal the plates.

SUMMARY OF THE INVENTION

According to one aspect of the present invention, a method is provided of making a vacuum vessel including a pair of plates including a face plate and a rear plate bonded to each other with a bonding member. The method includes applying the bonding member to a periphery of at least one of the face plate and the rear plate; placing the pair of plates, to at least one of which the bonding member has been applied, in contact with each other through the bonding member disposed therebetween at a temperature lower than the softening point or the melting point of the bonding member; fastening parts of sides of the pair of plates, which have been placed in contact with each other, to each other using a positioning jig made of bimetal; separating the pair of plates, the parts of sides of which have been fixed to each other, from each other by placing the pair of plates in an atmosphere having a pressure lower than atmospheric pressure and by thermally deforming the positioning jig by performing heating to a first temperature equal to or higher than the softening point or the melting point of the bonding member; and fixing the pair of plates to each other around the entire peripheries thereof using the bonding member by performing cooling from the first temperature so as to reduce thermal deformation of the positioning jig and by making the pair of plates, which have been separated from each other, contact each other through the bonding member disposed therebetween.

Further features of the present invention will become apparent from the following description of exemplary embodiments with reference to the attached drawings.

DESCRIPTION OF THE EMBODIMENTS

A method of making a vacuum vessel according to aspects of the present invention encompasses a method of making an image forming apparatus such as an FED, an SED, or a plasma display panel (PDP). In particular, the present invention may be suitable for making an FED or an SED.

Figure 1:
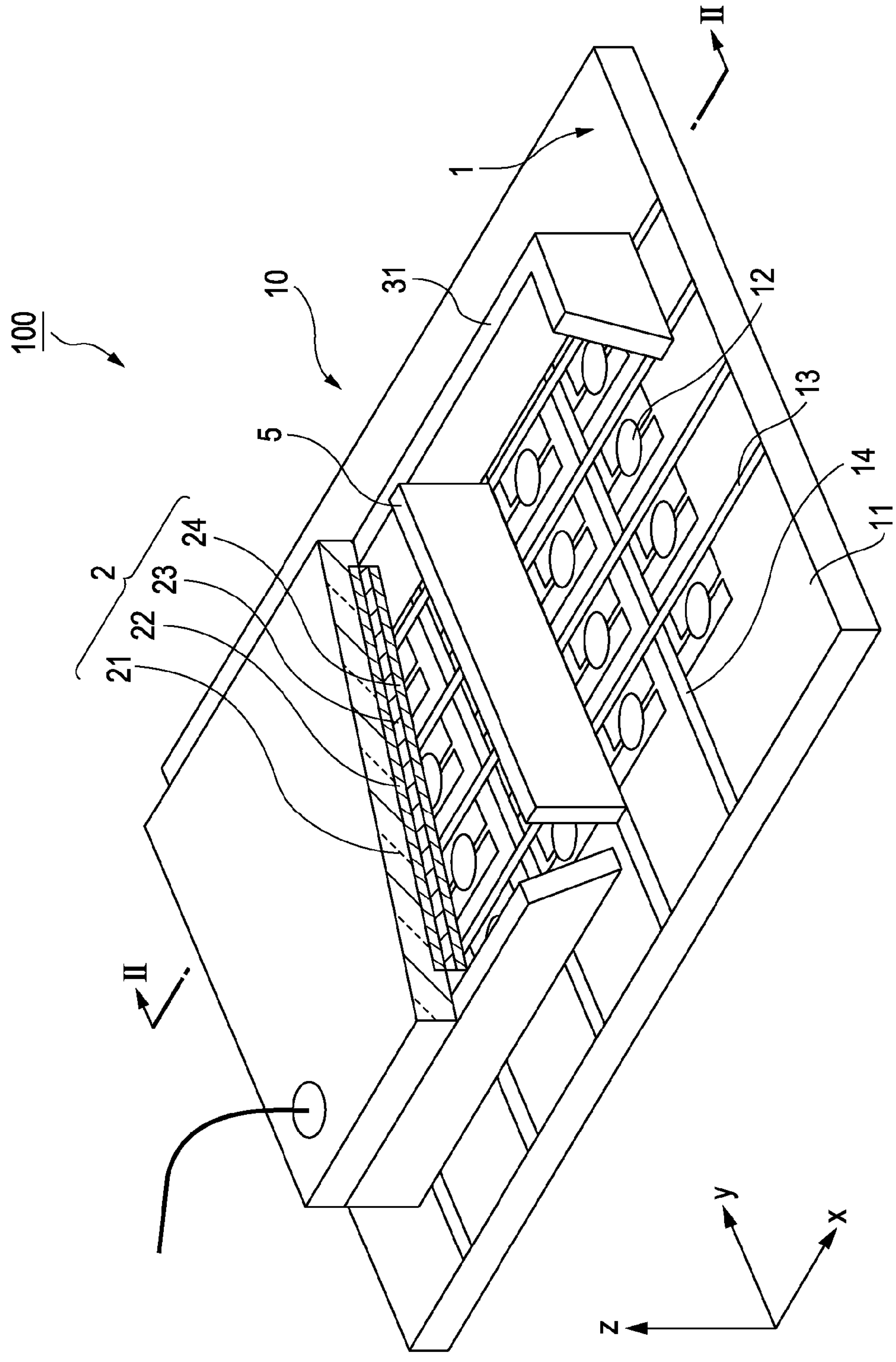
FIG. 1 is a perspective view illustrating the outline structure of an image forming apparatus to which an embodiment of the present invention may be applied.
Figure 2:
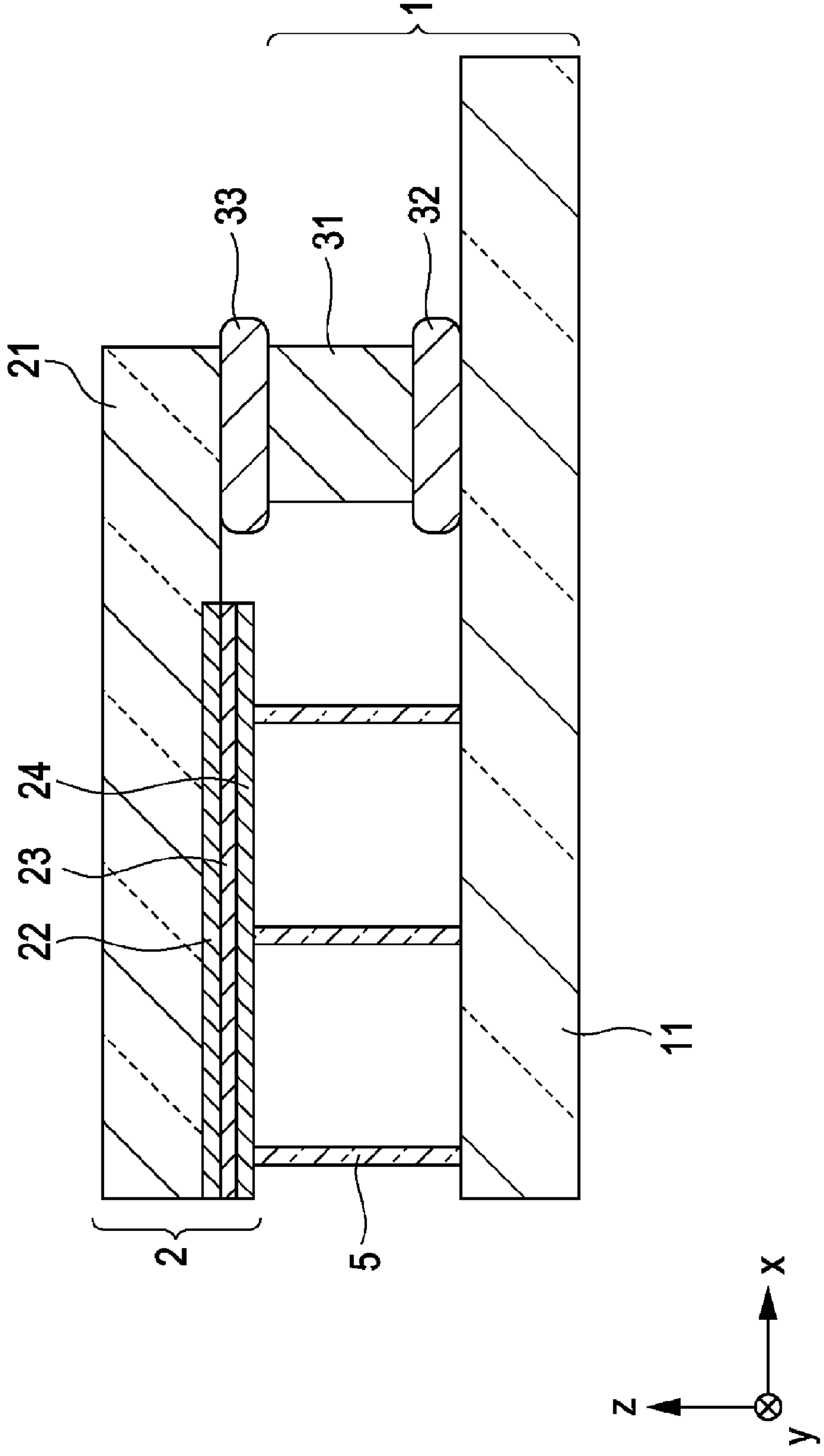
FIG. 2 is a partial sectional view taken along line II-II of FIG. 1.

An embodiment of the present invention is illustrated in detail below using an SED as an example with reference to the drawings. FIG. 1 is a perspective view showing the outline structure of an image forming apparatus to which the embodiment is applied. FIG. 2 is a partial sectional view taken along line II-II of FIG. 1.

Referring to FIGS. 1 and 2, the structure of an image forming apparatus to which the embodiment is applied is described. An image forming apparatus 100 according to the embodiment includes a rear plate 1. The rear plate 1 includes a glass substrate 11, electron-emitting devices 12 disposed on the glass substrate 11, and wiring 13 and wiring 14 connected to the electron-emitting devices 12. The image forming apparatus 100 further includes a face plate 2. The face plate 2 includes a glass substrate 21; and a fluorescent film 22, a metal back 23, and a getter 24, formed on the glass substrate 21. The rear plate 1 includes a support frame 31. When the support frame 31 is bonded to the face plate 2, a pair of plates including the rear plate 1 and the face plate 2 form a vacuum vessel 10 having a vacuum inner space.

In the embodiment, spacers 5, which serve as supporters, are disposed between the rear plate 1 and the face plate 2. Thus, even when the image forming apparatus 100 is a large-screen display, the vacuum vessel 10 can be made sufficiently resistant to atmospheric pressure.

A substrate made of soda-lime glass is generally used for the rear plate 1. In this case, it may be that a silicon oxide layer, which serves as a sodium block layer, having a thickness of 0.5 μm is formed on the substrate by a sputtering method. Alternatively, a substrate made of glass having a low sodium content, quartz, or an alkali-free substance can be used for the rear plate 1. For a plasma display, glass having a low alkali content, such as PD-200 (made by Asahi Glass Co., Ltd.) can be used for the rear plate 1.

As with the rear plate 1, a substrate made of soda-lime glass is may be used for the face plate 2. In the embodiment, PD-200 (made by Asahi Glass Co., Ltd.), which is a glass substrate for PDP having low alkali content, is used for the face plate 2.

The spacers 5 may also be made of soda-lime glass. However, the material for the spacers 5 can be selected in accordance with the usage of the vacuum vessel 10. If it is necessary to position the spacers 5 precisely, it may be that the spacers 5 are made of the same material as glass members to which the spacers 5 are bonded and have the same thermal expansion coefficient. For an image forming apparatus including the electron-emitting devices 12, the spacers 5 are designed by taking path of electrons into account.

The glass substrate 11 is bonded to the support frame 31 using a bonding member 32. The support frame 31 is bonded to the rear plate 2 using a bonding member 33. The bonding members 32 and 33 may be respectively made of frit glass having approximately the same thermal expansion coefficient as the face and rear plates 1 and 2 or made of a low-melting-point metal such as In, In—Ag, or In—Sn. The bonding members 32 and 33 may be made of different materials or may be made of the same material. It may be the case that, for example, both of the bonding members 32 and 33 be made of In or In—Ag.

It is sufficient that the bonding member 32 be applied to at least one of the glass substrate 11 and the support frame 31. Likewise, it is sufficient that the bonding member 33 be applied to at least one of the face plate 2 and the support frame 31. The bonding members 32 and 33 are applied such that the sum of the thicknesses of the bonding members 32 and 33 before the glass substrate 11, the face plate 2, and the support frame 31 are bonded to one another is sufficiently larger than the sum of the thicknesses of the bonding members 32 and 33 after they are bonded to one another. In the embodiment, the bonding members 32 and 33 are applied such that In layers of the bonding members 32 and 33 have a thickness of 300 μm.

The face plate 2 has the fluorescent film 22, the metal back 23, and the getter 24, formed on a surface of the glass substrate 21 facing the rear plate 1. The area in which these elements are formed serves as an image display area. It may be the case that the getter 24 is evenly disposed in the entire image display area.

In the embodiment, the support frame 31 is included in the rear plate 1. However, the support frame 31 may also be included in the face plate 2. In this case, by bonding the support frame 31 to the rear plate 1, a vacuum inner space is formed between the pair of plates including the face plate 2 and the rear plate 1.

Figure 3:
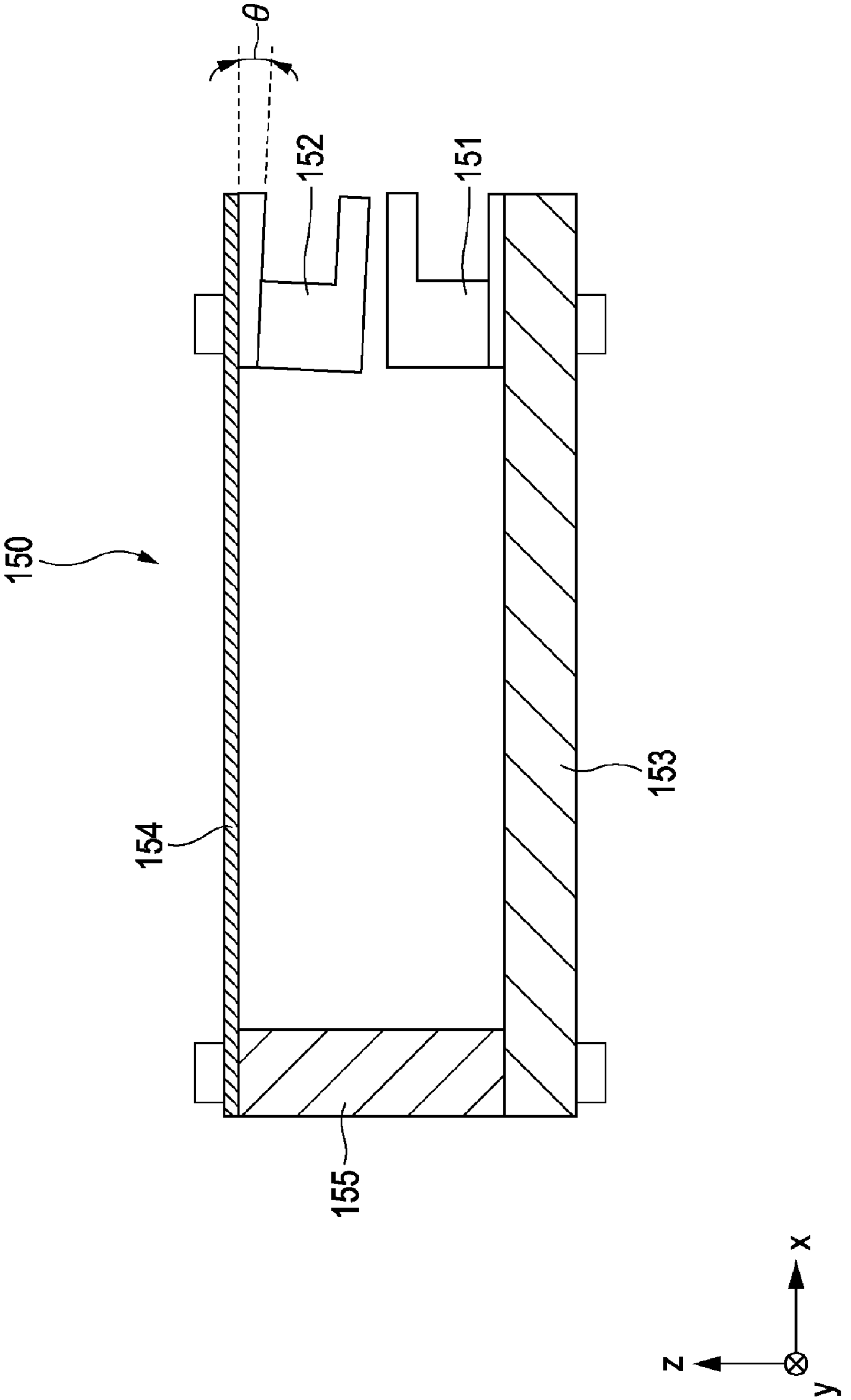
FIG. 3 is a schematic structural view of a positioning jig used in the embodiment.

Next, the structure of a positioning jig is described. FIG. 3 is a schematic structural view of a positioning jig used in the embodiment. A positioning jig 150 includes a plate fixing member 151 for fixing the rear plate 1 therein and a plate fixing member 152 for fixing the face plate 2 therein. The positioning jig 150 further includes a base member 153 to which the plate fixing member 151 is fixed, a thermal deformation member 154 to which the plate fixing member 152 is fixed, and a supporting member 155 supporting the thermal deformation member 154 and the base member 153. The thermal deformation member 154 is deformable in accordance with a temperature profile. The plate fixing members 151 and 152, the base member 153, the supporting member 155, and other members are fixed to each other with screws. It may be the case that the screws are made of a material, such as Ti or Ti alloy, having a thermal expansion coefficient substantially the same as the material (e.g., PD200) of the rear plate 1 and the face plate 2.

In the embodiment, the thermal deformation member 154 is made of bimetal TM4. The term "TM4" stands for "thermostat metal 4", which is a Japan Industrial Standard for a bimetal using an iron-nickel alloy of nickel content 36% for the low-expansion side and using nickel for the high-expansion side. The bimetal may be used because it has a wide range of allowable temperatures from −70° C. to 500° C. The thermal deformation member 154 is set so that the distance between the thermal deformation member 154 and the base member 153 increases when heating is performed (in other words, such that the thermal deformation member 154 deforms upward in FIG. 3). The positioning jig may include another thermal deformation member instead of the base member 153, and the positioning jig having two thermal deformation members may be used. Also in this case, the thermal deformation members are set so that the distance between the thermal deformation members increases when heating is performed. As described below, in order to provide sufficient pressure to the plates when bonding is performed, it may be the case that the angle θ between the thermal deformation member 154 and an insertion surface of the plate fixing member 152 is greater than 0.

Next, processing steps for making an image forming apparatus according to the embodiment are described.

Step 1: Step of Applying Bonding Member

First, the rear plate 1 and the face plate 2 are prepared. The bonding members 32 are applied to predetermined positions on the glass substrate 11 beforehand, the support frame 31 is placed on the bonding members 32, and the bonding members 33 are applied to the support frame 31. Next, the spacers 5 are disposed at predetermined positions on the rear plate 1. As a result, the bonding members 33 are applied to peripheries of both the rear plate 1 and the face plate 2, since the support frame 31 is included in the rear plate 1. However, the bonding members 33 may be applied to only one of the rear plate 1 and the face plate 2.

Step 2: Step of Placing Plates in Close Contact

Figure 4:
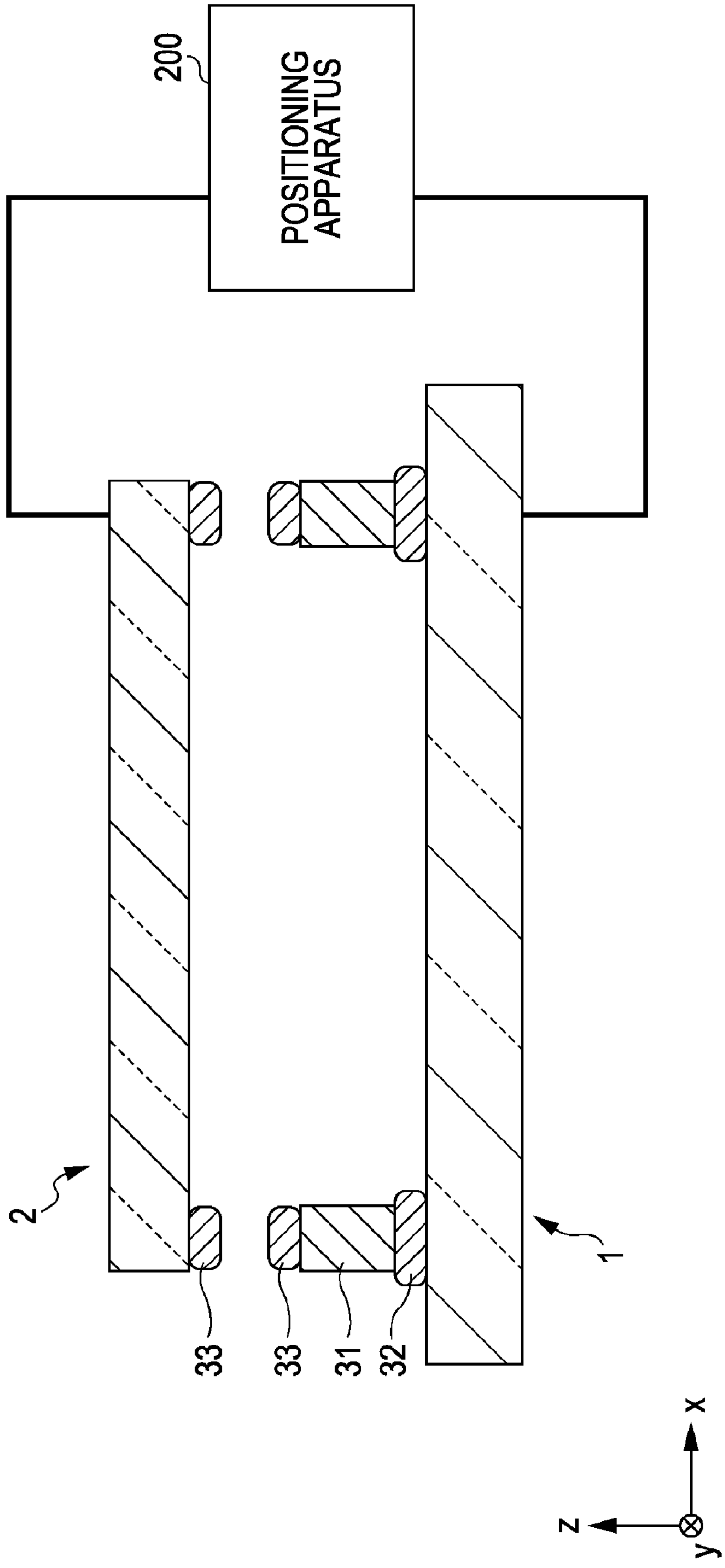
FIG. 4 is a sectional view illustrating a step of placing plates in close contact with each other according to the embodiment.
Figure 5:
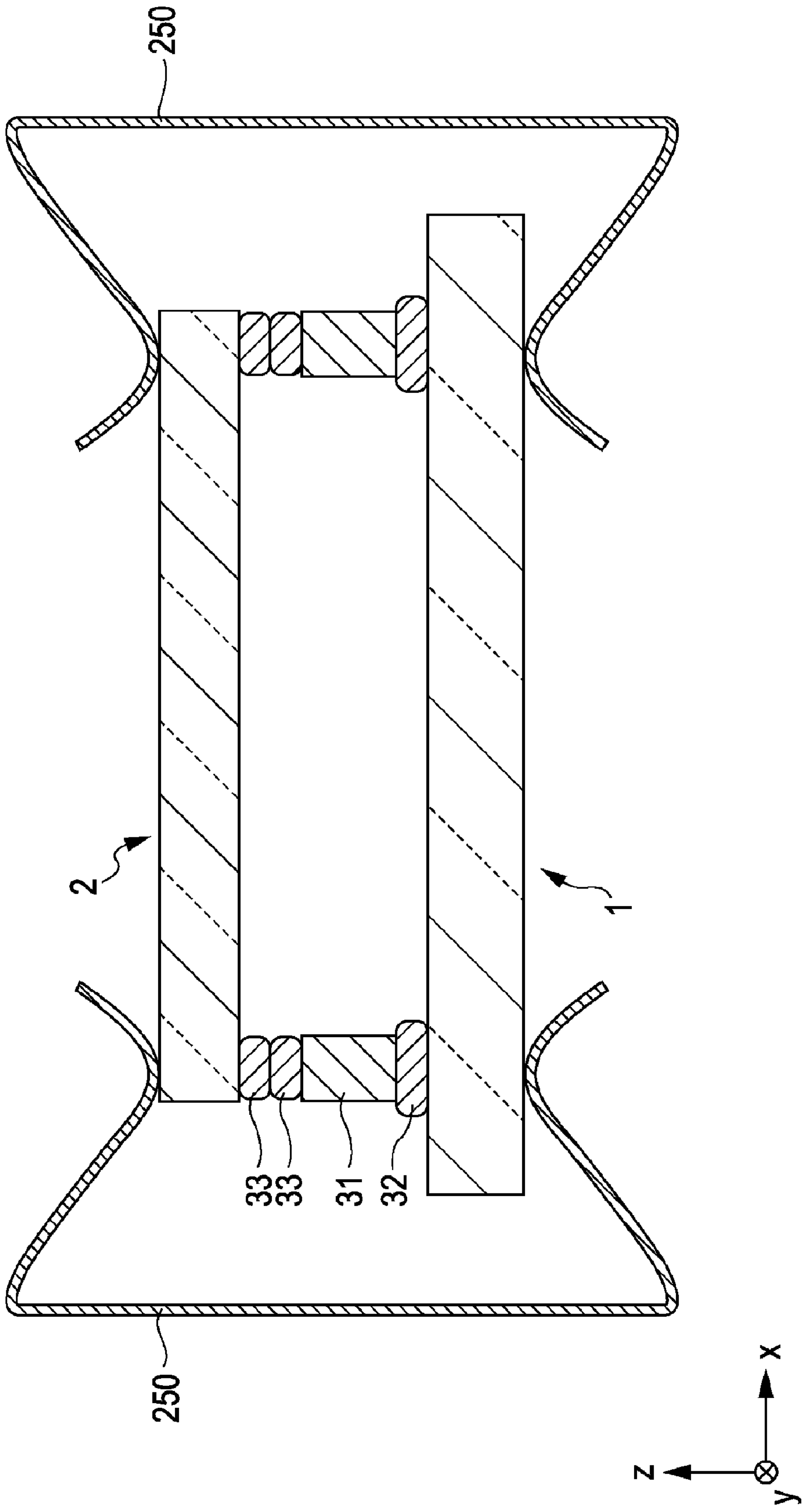
FIG. 5 is a sectional view illustrating a step of placing plates in close contact with each other according to the embodiment.

The pair of plates 1 and 2, to which the bonding members have been applied, are placed in close contact with each other with the bonding members 33 therebetween. To be specific, first, the positions of the plates 1 and 2 are adjusted so that the electron-emitting devices 12 arranged on the rear plate 1 correspond to phosphor (not shown) in the fluorescent film 22 arranged on the face plate 2. As shown in FIG. 4, in the embodiment, a positioning apparatus 200 is used. The positioning apparatus 200 can move at least one of the plates 1 and 2 in horizontal directions (x and y directions) and in a rotation direction (θ direction) relative to the other one of the plates 1 and 2, so that the relative positions of the plates 1 and 2 can be precisely adjusted. As shown in FIG. 5, in this state, the rear plate 1 and the face plate 2 are placed in close contact with each other with the bonding members 33 therebetween. This step is performed at room temperature, that is, at a temperature lower than the melting point (or the softening point) of the bonding members 32 and 33. Since the bonding members 32 and 33 do not melt, the support frame 31 is not bonded to the face plate 2 and the support frame 31 is not bonded to the glass substrate 11. It may be the case that, after the face plate 1 and the rear plate 2 have been placed in close contact with each other, the plates 1 and 2 are pressed against each other using temporary fixing units 250 such as clips so that the relative positions of the plates 1 and 2 are temporarily fixed.

Step 3: Step of Partial Fastening

Figure 6:
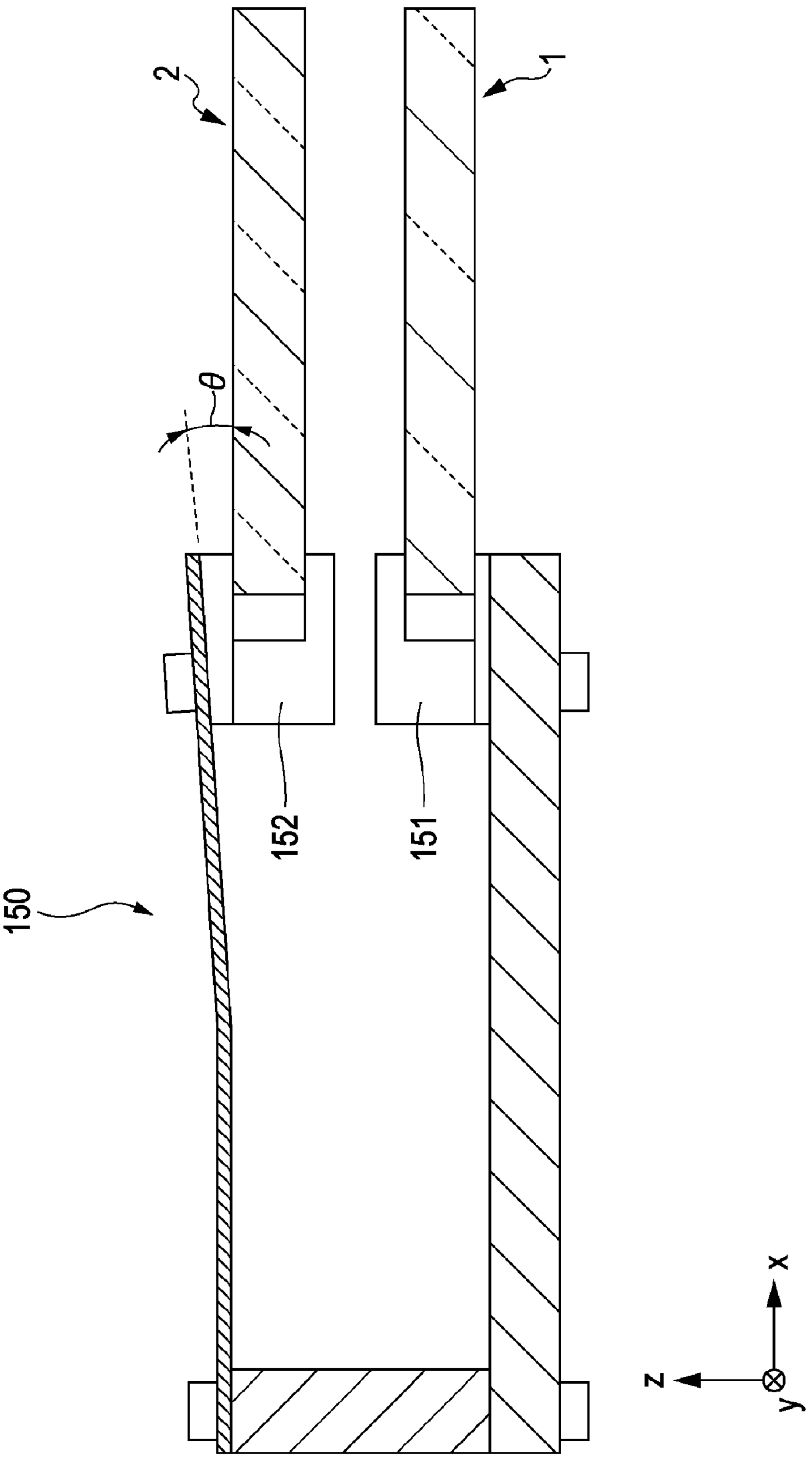
FIG. 6 is a sectional view illustrating a step of separating plates according to the embodiment.

After the pair of plates 1 and 2 have been placed in close contact with each other, parts of the sides of the plates 1 and 2 are fixed (fastened) to each other using the positioning jig 150. To be specific, first, in a state in which the rear plate 1 and the face plate 2 are temporarily fixed to each other using the temporary fixing units 250, the rear plate 1 and the face plate 2 are inserted into the plate fixing members 151 and 152 of the positioning jig 150. At room temperature, the distance between the plate fixing member 151 and the plate fixing member 152 of the positioning jig 150 is smaller than the distance between the plates 1 and 2 with the support frame 31 and the bonding members 32 and 33 therebetween. The distance between the plate fixing member 151 and the plate fixing member 152 of the positioning jig 150 is increased by using an external force. Thus, as shown in FIG. 6, the rear plate 1 and the face plate 2 can be attached to the positioning jig 150 while maintaining a state in which the rear plate 1 and the face plate 2 are parallel to each other, due to the presence of the inclination angle θ between the thermal deformation member 154 and the fastening surface of the plate fixing member 152. Instead of using an external force, the distance between the base member 153 and the thermal deformation member 154 may be increased by locally heating the thermal deformation member 154.

Figure 7A:
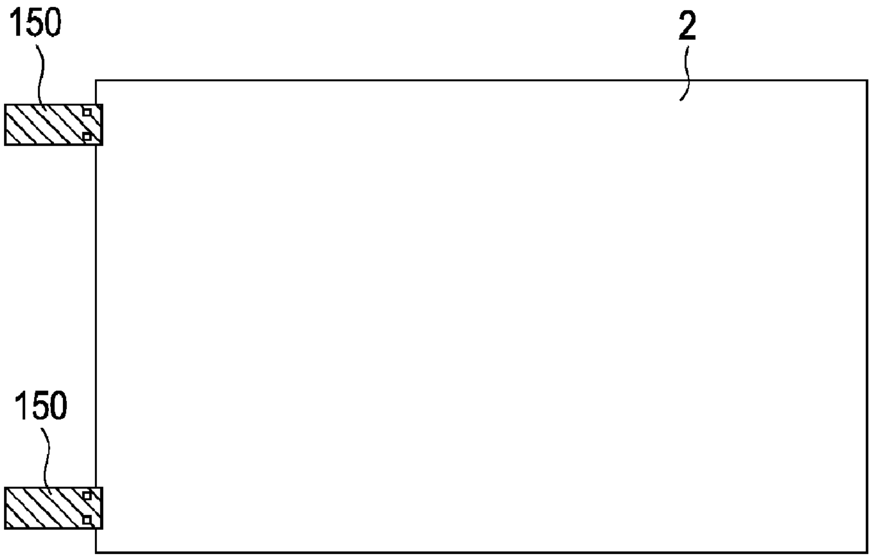
FIG. 7A is a plan view illustrating a disposition of positioning jigs.
Figure 7B:
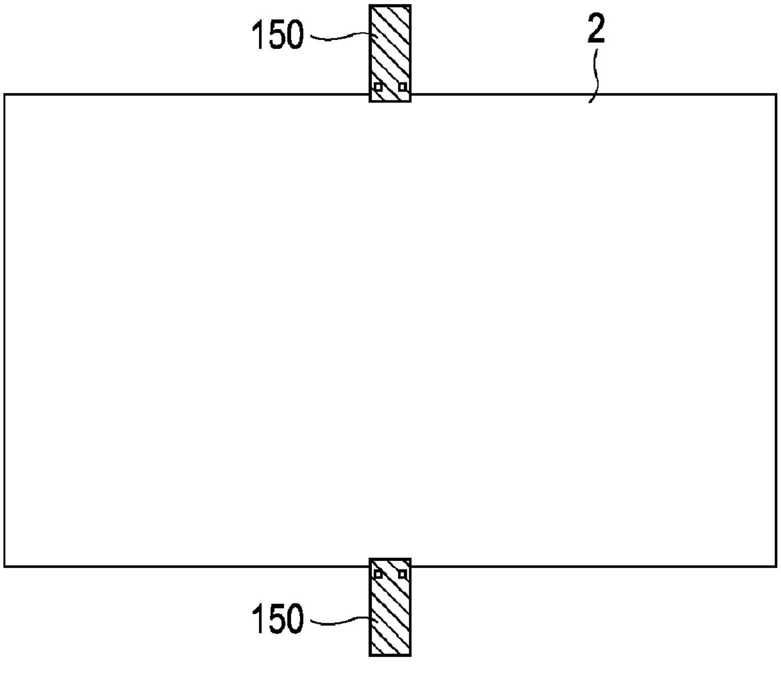
FIG. 7B is a plan view illustrating a disposition of positioning jigs.

Then, the rear plate 1 is fixed to the plate fixing member 151, and the face plate 2 is fixed to the plate fixing member 152. They may be fixed with an adhesive or with mechanical fasteners such as screws. Thus, the relative positions of the plates 1 and 2 are fixed and the plates 1 and 2 are fastened to each other. Then, the temporary fixing units 250 are removed. The number and positions of fastening points are not particularly limited, as long as the distance between the plates is secured when heating is performed. For example, as shown in FIG. 7A, a side of the rear plate 1 may be fastened to a side of the face plate 2. Alternatively, as shown in FIG. 7B, middle portions of opposite sides of the rear plate 1 may be fastened to middle portions of opposite sides of the face plate 2.

Step 4: Step of Separating Plates

Next, the pair of plates, which have been fastened to each other using the positioning jig 150, are placed in a sealing chamber (not shown) and baked in a reduced-pressure atmosphere, such as an atmosphere having a pressure that is less than atmospheric pressure. This step may be referred to as a baking step. In the embodiment, baking is performed for one hour at 350° C. However, the condition for baking may be appropriately set in accordance with, for example, conditions for manufacturing image forming apparatuses. However, it may be necessary that the inside of the chamber be heated at least to a temperature (first temperature) that is equal to or higher than the melting point (or the softening point) of the bonding members 32 and 33. The thermal deformation member 154 of the positioning jig 150 is thermally deformed, so that the pair of plates 1 and 2 are separated. As a result, a closed inner space, which has been temporarily formed between the plates 1 and 2, is opened and the inner space is exposed to the reduced-pressure atmosphere, so that the inner space is evacuated.

Figure 8:
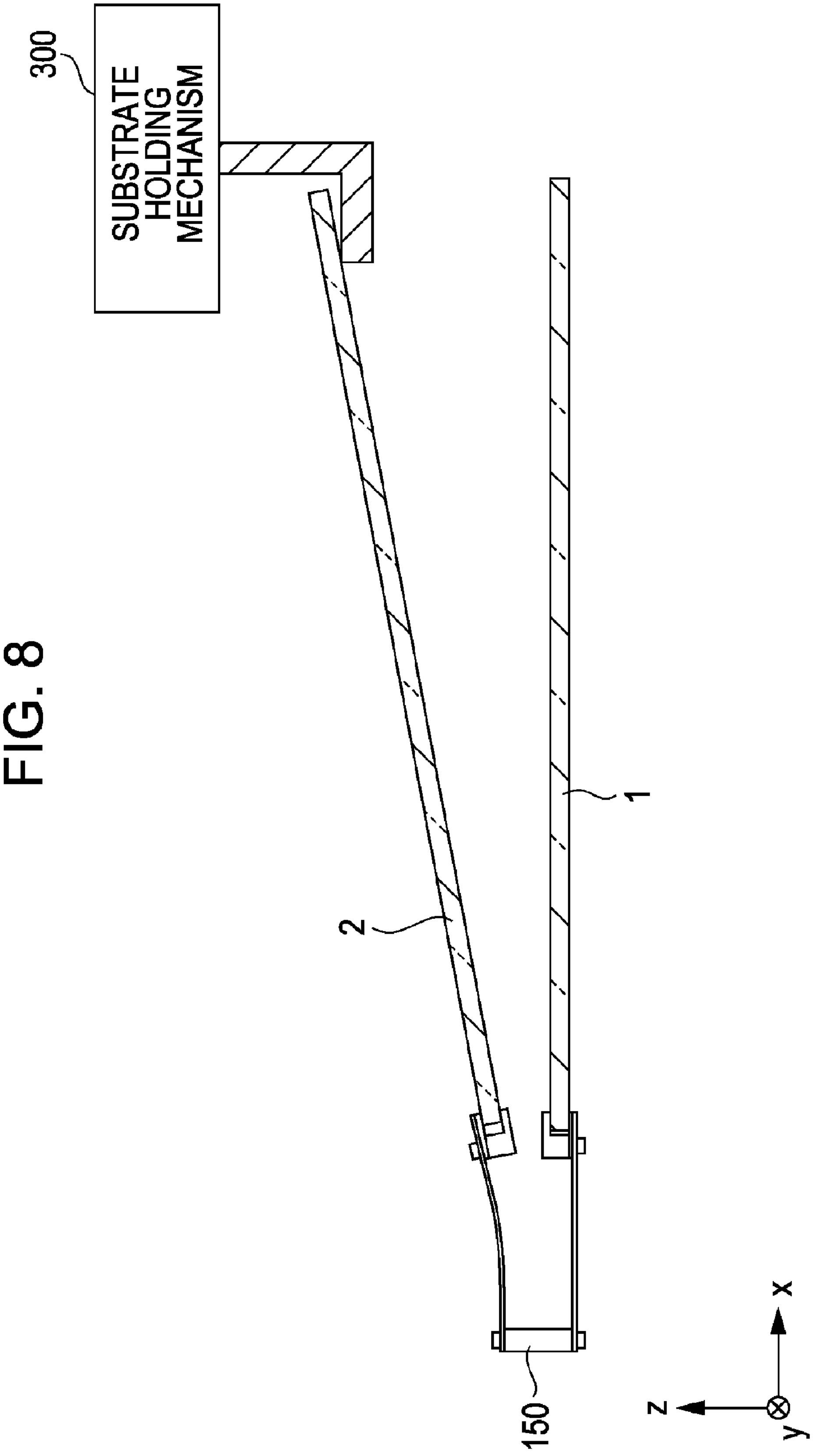
FIG. 8 is a sectional view illustrating a step of separating the plates according to the embodiment using a plate holding mechanism.

It may be the case that the rear plate 1 and the face plate 2 are sufficiently separated from each other so that the inner space is sufficiently evacuated. If the plates can be sufficiently separated from each other with only thermal deformation of the positioning jig 150 during baking, the thermal deformation of the positioning jig 150 is sufficient for this purpose. However, if the weights of the plates exceed a force generated by the thermal deformation member so as to separate the plates, or if the plates are considerably warped, the plates may not be sufficiently separated from each other with only thermal deformation of the positioning jig 150. In this case, as shown in FIG. 8, by using an external mechanism such as a plate holding mechanism 300 for securing the distance between the plates, an external force can be applied to at least one side of the plates 1 and 2 in a direction in which the plates are separated from each other. Thus, the distance between the plates can be increased and a sufficient distance between the plates can be maintained. The external force may be applied to one or both of the rear plate 1 and the face plate 2.

Instead of applying an external force, the thermal deformation member 154 of the positioning jig 150 may be wound with a heating wire (not shown). By locally heating the thermal deformation member 154 and raising the temperature of the thermal deformation member 154 to a temperature higher than those of the plates, thermal deformation of the thermal deformation member 154 is increased and hence the distance between the plates is increased. The temperature of the positioning jig can be controlled independently of the temperature of the plates. Thus, if sufficient conductance between the plates cannot be obtained from deformation of the positioning jig at a temperature for baking plates, this method of local heating can be used so as to increase the distance between the plates and increase conductance between the plates.

Step 5: Step of Entire Fixing

After the baking step, the temperature is decreased from the first temperature so that thermal deformation of the positioning jig 150 is decreased. As the temperature decreases, the thermal deformation member 154 recovers its original shape, and the distance between the rear plate 1 and the face plate 2 returns to its original value. As a result, the plates, which have been separated, closely contact each other with the bonding members 33 therebetween. The entire perimeters of the pair of plates 1 and 2 are fixed with the bonding members 33, so that the plates 1 and 2 are bonded to each other and sealed.

Figure 9:
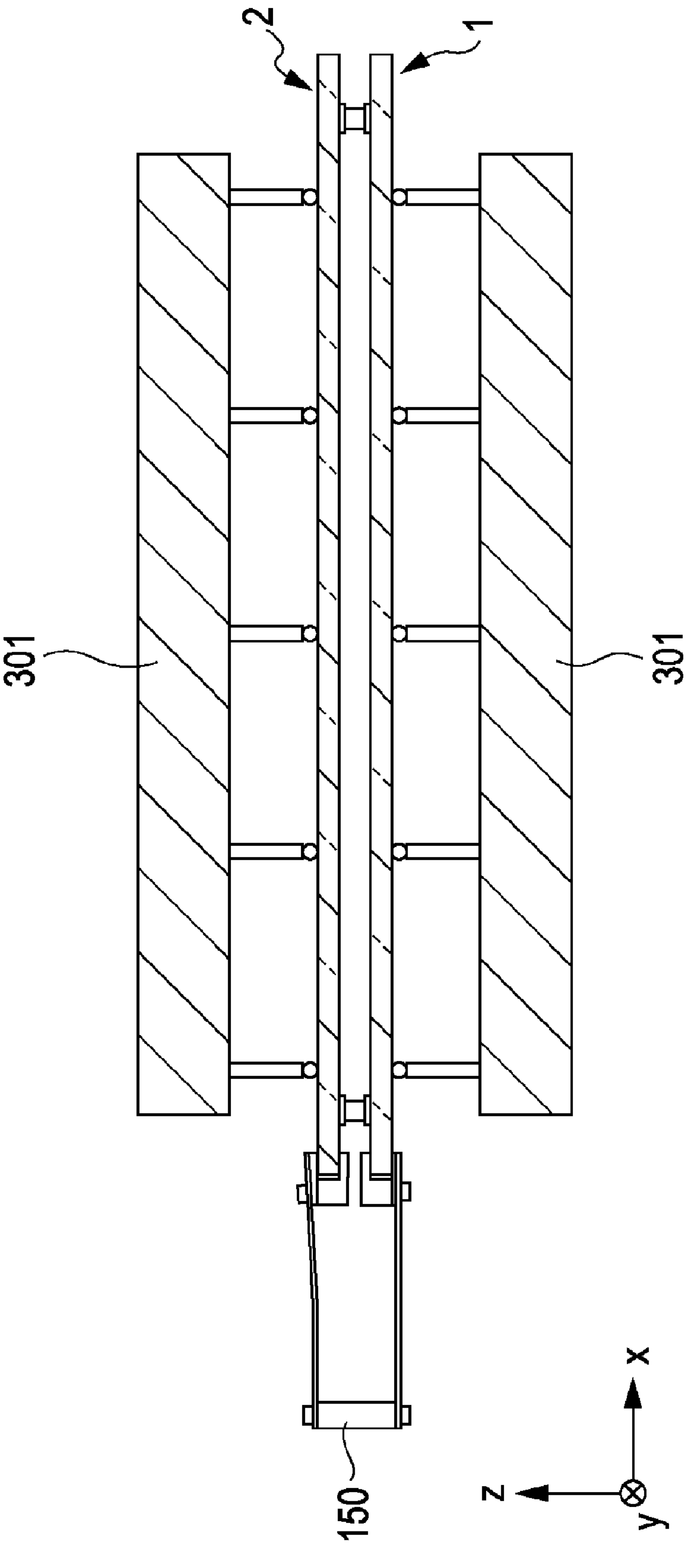
FIG. 9 is a sectional view illustrating a step of fixing plates around the entire perimeter thereof according to the embodiment using an external pressing mechanism.

If pressure from the thermal deformation member is insufficient, as shown in FIG. 9, for example, an external pressing mechanism 301 having pressing pins or the like may be used to apply an auxiliary pressure. It may be the case that the auxiliary pressure is perpendicular to the principal surfaces of the pair of plates 1 and 2. However, it may not be necessary that the auxiliary pressure be strictly perpendicular to the principal surfaces. As described above, deviation of the relative positions of the plates 1 and 2 in horizontal directions (directions parallel to the principal surfaces of the plates) may be prevented by using the positioning jig 150, and the plates 1 and 2 can be held in correct relative positions even if a force in a horizontal direction is applied.

As described above, in the embodiment, the face plate and the rear plate are separated from each other in the baking step, so that the atmosphere between the plates when the plates are bonded to each other is improved (pressure is reduced). Since relative movements of the face plate and the rear plate in in-plane directions (x and y directions, which are the above-mentioned horizontal directions) are restrained with the positioning jig, even if a pressure in an in-plane direction is applied to the plates when they are bonded, deviation of the relative positions of the plates in an in-plane direction may be easily prevented. In the bonding step, the positioning jig applies its restoration force to the plates so as to press the plates against each other. Thus, it may not be necessary to press the plates with an extra force or only a weak force is necessary. Therefore, the plates can be bonded to each other with a small pressure, so that the relative positions of the plates in in-plane directions are more precisely set.

EXAMPLE 1

In this example, a rear plate 1 was made by forming a $S_iO_2$ layer of 300 nm thickness on a glass substrate 11, and then forming electron-emitting devices and wiring. As the glass substrate 11, a plate of PD-200 (made by Asahi Glass Co., Ltd.) having a size (x direction, y direction) of 60 mm×60 mm and a thickness (z direction) of 0.7 mm was used. A face plate 2 was made by forming a fluorescent film 22 and a getter 24 on a plate of PD-200 (made by Asahi Glass Co., Ltd.) having a size (x direction, y direction) of 60 mm×60 mm and a thickness (z direction) of 0.7 mm. As a support frame 31, a plate of PD-200 (made by Asahi Glass Co., Ltd.) having a size (x direction, y direction) of 50 mm×50 mm and a thickness (z direction) of 1.3 mm was used An image forming apparatus was made from the rear plate 1, the face plate 2, and spacers 5. As the spacers 5, strips of PD-200 (made by Asahi Glass Co., Ltd.) each having a length (y direction) of 40 mm, a width (x direction) of 200 μm, and a height (z direction) of 1.6 mm were used. An antistatic layer (not shown) was formed on surfaces of each of the spacers 5.

As bonding members 32 for bonding the glass substrate 11 and the support frame 31 to each other, a low-melting-point glass was used. The glass substrate 11 and the support frame 31 were fixed to each other beforehand. As bonding members 33 for bonding the face plate 2 and the support frame 31 to each other, In (having a melting point of 160° C.) was used. The bonding members 33 were configured to have a thickness (z direction) of 300 μm before bonding and a thickness of 150 μm after bonding.

At a temperature of 20° C., a supporting member 155 of a positioning jig 150 had a height (z direction) of 0.8 mm; a thermal deformation member 154 had a length of 18 mm in x direction, a length of 18 mm in y direction, and a thickness of 0.6 mm in z direction; and the angle θ between the thermal deformation member 154 and a plate fixing member 152 was 2.7°.

The positions of the rear plate 1 and the face plate 2, to which the bonding members 33 had been applied, were adjusted at room temperature (20° C.). Then, the plates were placed in close contact with each other and temporarily fixed to each other. Before the pair of plates, which had been temporarily fixed to each other, were placed in a sealing chamber, the plates were fastened and partially fixed to each other using two positioning jigs 150. First, the positioning jigs 150 were prepared. An external force was applied to the positioning jigs 150 so that the distance between a base member 153 and the thermal deformation member 154 was increased to 1.8 mm. Next, the relative positions of the rear plate 1 and the face plate 2 in x and y directions were adjusted, and one side of each of the plates 1 and 2, which had been temporarily fixed to each other, was inserted into a corresponding one of plate fixing members 151 and 152. At this time, as shown in FIG. 7A, the positioning jigs 150 were disposed at positions 5 mm separated from the ends of the sides of the plates to which the positioning jigs 150 were attached. Then, the plate fixing members 151 and 152 and the plates 1 and 2 were firmly fixed to one another by applying Aron ceramics (made by Toagosei Co., Ltd.) thereto.

After the plates had been fastened to each other, the plates were placed in a sealing chamber, which was evacuated, heated at a rate of 2° C./min, and maintained at 350° C. for one hour, so that baking was performed. A plate holding mechanism 300 was not used. Only a deforming stress of the thermal deformation member 154 was used to raise one of the plates. As a result, the distance between the rear plate 1 and the face plate 2 was sufficiently increased, so that conductance between the plates was secured.

Next, the plates were cooled at a rate of 2° C./min to room temperature (20° C.), so that the plates were bonded to each other so as to be sealed. An external pressing mechanism 301 was not used. Only a deformation stress of the thermal deformation member 154 was used to bond the plates to each other.

In this example, at a baking temperature of 350° C., the rear plate 1 and the face plate 2 were separated from each other without using the plate holding mechanism 300, so that conductance was secured. At a bonding temperature, the rear plate 1 and the face plate 2 were made to closely contact each other using only the weight of the face plate 2 and a load from the positioning jigs 150 and without using an external pressing mechanism 301, so that the plates were bonded to each other so as to be sealed. As a result, an image forming apparatus having an excellent hermeticity and in which the rear plate 1 and the face plate 2 were positioned relative to each other with high precision was made.

EXAMPLE 2

In this example, a heating wire was wound around the thermal deformation members 154 of the positioning jigs 150 so as to locally heat the thermal deformation member 154. The example 2 is the same as the example 1, except that, in the baking step, the temperature of the thermal deformation member 154 was controlled to be different from those of the rear plate 1 and the face plate 2.

In the baking step, the plates were heated at a rate of 2° C./min, maintained at 350° C. for one hour so as to bake the plates. Then, the heating wire for local heating was energized so as to heat the thermal deformation member 154 to 400° C. At this time, the angle between the rear plate 1 and the face plate 2 was larger than that of the example 1, so that a more sufficient conductance was secured.

In this example, as in the example 1, an image forming apparatus in which the rear plate 1 and the face plate 2 were positioned relative to each other with high precision was made.

EXAMPLE 3

In this example, a rear plate 1 was made by forming a $S_iO_2$ layer of 300 nm thickness on the glass substrate, and forming the electron-emitting devices and wiring thereon. As the glass substrate, a plate of PD-200 (made by Asahi Glass Co., Ltd.) having a size (x direction, y direction) of 250 mm×200 mm and a thickness (z direction) of 1.8 mm was used. A face plate 2 was made by forming a fluorescent film 22 and a getter 24 on a plate of PD-200 (made by Asahi Glass Co., Ltd.) having a size (x direction, y direction) of 220 mm×170 mm and a thickness (z direction) of 1.8 mm. As spacers 5, a plate of PD-200 (made by Asahi Glass Co., Ltd.) having a length (y direction) of 180 mm, a width (x direction) of 200 v, and a height (z direction) of 1.6 mm was used. An antistatic layer (not shown) was formed on surfaces of the spacers 5.

An image forming apparatus was made from the rear plate 1, the face plate 2, and the spacers 5. As a support frame 31, a plate of PD-200 (made by Asahi Glass Co., Ltd.) having a size (x direction, y direction) of 200 mm×150 mm and a thickness (z direction) of 1.3 mm was used.

As bonding members 32, which bond the glass substrate 11 and the support frame 31 to each other, a low-melting-point glass was used, and the glass substrate 11 and the support frame 31 were fixed to each other beforehand. As bonding members 33, which bond the face plate 2 and the support frame 31 to each other, In was used. The bonding members 33 were configured to have a thickness (z direction) of 300 μm before bonding and a thickness of 150 μm after bonding.

Positioning jigs 150 each had the same size as that of the example 1. The process of fastening the rear plate 1 and the face plate 2 with the positioning jigs 150 and partially fixing the plates was the same as the example 1. As shown in FIG. 7A, the positioning jigs 150 were disposed at positions 20 mm separated from the ends of sides to which the positioning jigs 150 were attached.

After the plates had been fastened to each other, the plates were placed in the sealing chamber, which was evacuated, heated at a rate of 2° C./min, and maintained at 350° C. for one hour, so that baking was performed. In the baking step, it was difficult to sufficiently raise the face plate 2 using only deformation of the thermal deformation member 154. Thus, using the plate holding mechanism 300, a side of the face plate 2 opposite the side at which the face plate was fastened to the rear plate 1 was raised. To be specific, the face plate was started to be raised at 180° C., and at a baking temperature of 350° C., the raised distance was 40 mm.

Next, at a rate of 2° C./min, the plates were cooled to room temperature (20° C.), and the plates were bonded to each other so as to be sealed. In the bonding process, the plates were bonded by applying pressure to the plates at a temperature of 180° C. using a load of 10 kgf from the external pressing mechanism 301 and a pressure from a restoration force of the thermal deformation member 154.

In this example, the external pressing mechanism 301 was used because the pressure was insufficient. The pressure from the external pressing mechanism 301 could be reduced in accordance with the amount of the restoration force of the thermal deformation member 154. Also in this example, an image forming apparatus in which the rear plate 1 and the face plate 2 were positioned with high precision was made.

EXAMPLE 4

In this example, the rear plate 1, the face plate 2, the support frame 31, and the spacers 5 were same as those of the example 3. Thickness of the bonding members and the like were the same as the example 3. The positioning jigs 150 have the same size as the example 3.

Before the plates were placed in the sealing chamber, the plates were fastened to each other with two positioning jigs 150, and partially fixed to each other. First, the positioning jigs 150 were prepared, and an external force was applied so that the distance between the base member 153 and the thermal deformation member 154 was increased to 1.8 mm. Next, the relative positions of the rear plate 1 and the face plate 2 were adjusted in x and y directions, and the plates were temporarily fixed to each other. The middle portions of the long sides of the rear plate 1 and the face plate 2 facing each other were inserted parallel to each other into the plate fixing members 151 and 152. The positioning jigs 150 were disposed as shown in FIG. 7B. Then, Aron ceramics (made by Toagosei Co., Ltd.) was applied so that the plate fixing members 151 and 152 and the plates were firmly fixed to each other.

After the plates had been fastened to each other, the plates were placed in the sealing chamber, which was evacuated, heated at a rate of 2° C./min, and maintained at 350° C. for one hour, so that baking was performed. In the baking step, it was difficult to raise the face plate 2 by using only deformation of the thermal deformation member 154. Thus, using the plate holding mechanism 300, middle portions of two sides of face plate 2 at which the face plate 2 was not fastened to the rear plate 1 were raised. To be specific, the face plate was started to be raised when the temperature was 180° C. When the temperature increased to 350° C. during baking, the distance between the plates was 10 mm.

Next, at a rate of 2° C./min, the plates were cooled to room temperature (20° C.), so that the plates were bonded to each other so as to be sealed. In the bonding process, the plates were bonded to each other by applying pressure to the plates at a temperature of 180° C. using a load of 10 kgf from the external pressing mechanism 301 and a pressure from a restoration force of the thermal deformation member 154.

In this example, it was difficult to increase the distance between the plates as compared with the example 2 due to the disposition of the positioning jigs. However, an image forming apparatus in which the plates were positioned relative to each other with high precision was made.

In the above-described examples, In was used for the bonding members 33. However, the material for the bonding members 33 is not limited thereto. Low-melting-point frit glass may be used for the bonding members 33. In this case, the process of placing the rear plate 1 and the face plate 2 in close contact with each other may be performed at a temperature below the melting point or the softening point of the frit glass. Then, the plates may be partially fixed to each other using the jigs, and the plates may be separated from each other at a temperature equal to or higher than the softening point of the low-melting-point frit glass.

Furthermore, according to the examples, since parts of sides of the plates are fastened to each other with the positioning jig, even if the plates are moved by being heated or cooled or by pressure, deviation of the relative positions of the plates in horizontal directions is suppressed as compared with existing methods. Moreover, the plates can be fastened to each other only using a simply structured positioning jig. Thus, the present invention provides a simple method of making a vacuum vessel, in which a space between the plates is exposed to a high-temperature reduced-pressure atmosphere, and then the plates are bonded and sealed while suppressing deviation of the relative positions of the plates.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-237931 filed Sep. 17, 2008, which is hereby incorporated by reference herein in its entirety.

What is claimed is:

1. A method of making a vacuum vessel including a pair of plates including a face plate and a rear plate bonded to each other using a bonding member, the method comprising:

applying the bonding member to a periphery of at least one of the face plate and the rear plate;

placing the pair of plates, to at least one of which the bonding member has been applied, in contact with each other through the bonding member disposed therebetween at a temperature lower than the melting point of the bonding member;

fastening parts of sides of the pair of plates, which have been placed in contact with each other, to each other using a positioning jig made of bimetal;

separating the pair of plates, the parts of sides of which have been fastened to each other, from each other by placing the pair of plates in an atmosphere having a pressure lower than atmospheric pressure and by thermally deforming the positioning jig by performing heating to a first temperature equal to or higher than the melting point of the bonding member; and fixing the pair of plates to each other around the entire peripheries thereof using the bonding member by performing cooling from the first temperature so as to reduce thermal deformation of the positioning jig and by making the pair of plates, which have been separated from each other, contact each other through the bonding member disposed therebetween.

2. The method of making a vacuum vessel according to claim 1, wherein separating the pair of plates includes locally heating the positioning jig.

3. The method of making a vacuum vessel according to claim 1, wherein fixing the pair of plates includes pressing the pair of plates against each other with a force having a component perpendicular to principal surfaces of the pair of plates.

4. The method of making a vacuum vessel according to claim 1, further comprising temporarily fixing the pair of plates that have been placed in contact with each other, the temporary fixing being performed between placing of the plates in contact with each other and fastening of the parts of sides of the plates.

* * * * *